US000001152H

United States Statutory Invention Registration [19]

[11] Reg. Number: H1152

Korendyke

[43] Published: Mar. 2, 1993

[54] IMAGING CHANNELED SPECTROGRAPH

[75] Inventor: Clarence M. Korendyke, Ft. Washington, Md.

[73] Assignee: United States of America, Washington, D.C.

[21] Appl. No.: 588,915

[22] Filed: Sep. 27, 1990

[51] Int. Cl.[5] ..... G01J 3/28

[52] U.S. Cl. ..... 356/328; 356/330

[58] Field of Search ..... 356/319-334

[56] References Cited

PUBLICATIONS

Speer et al, "Etalon-Spectograph System for Improved Resolution Over a Wide Spectral Range" Applied Optics, vol. 19, #16, Aug. 15, 1980.

Sato et al, "A Synchronous Wavelength Sweeping Method of a Diffraction Grating Fabry-Perot Interferometer in U.V. and Visible Ranges," Japanese Journal of Applied Physics, vol. 14, #9, Sep. 1975.

*Primary Examiner*—Bernarr E. Gregory

*Attorney, Agent, or Firm*—Thomas E. McDonnell

[57] ABSTRACT

An Imaging Channeled Spectrograph is provided which comprises a Fabry-Perot bandpass filter followed by a wide-slit imaging grating spectrograph, and which thus combines the two dimensional monochromatic imaging of a Fabry-Perot bandpass filter system with the high resolution and comprehensive wavelength coverage of a grating spectrograph. The Imaging Channeled Spectrograph produces a series of simultaneous, high resolution, non-overlapping, two dimensional monochromatic images of the entrance slit uniformly distributed over a large spectral range.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IMAGING CHANNELED SPECTROGRAPH

FIELD OF THE INVENTION

The present invention relates to spectroscopy and in particular to an improved spectrograph which combines a Fabry-Perot bandpass filter with a wide-slit imaging spectrograph.

BACKGROUND OF THE INVENTION

Many different instrumental techniques are commonly used to accomplish spectroscopic analysis. Hitherto, two-dimensional monochromatic images have been obtained mainly by thin-film filter systems, narrow-bandpass tunable interferometric monochromators, and wide-slit spectrographs.

Thin-film filter systems and monochromators usually require narrow bandpass thin film filters as prefilters. Since these prefilters are tunable over only a very limited spectral range, these systems do not permit simultaneous observations of multiple emission lines spread over a large spectral range.

The wide-slit spectrographs produce multiple emission line images across a broad spectral range. However, the wide-slit which permits two dimensional imaging also results in a corresponding degradation in spectral and spatial resolution. This spectrograph also suffers from image overlap when it is used to image closely packed emission lines.

SUMMARY OF THE INVENTION

In accordance with the invention an imaging channeled spectrograph is provided which includes a Fabry-Perot bandpass filter for bandpass filtering a received collimated beam of light into a filtered beam comprising a number of limited frequency bands of the light of the collimated beam, and an imaging spectrograph for receiving the filtered beam from the Fabry-Perot filter and dispersing the spectrum of the filtered beam across the focal plane of the spectrograph. The invention produces a number of two dimensional monochromatic images of the entrance slit spanning a large spectral range without image overlap and without loss of spectral or spatial resolution In a preferred embodiment, the invention includes an entrance slit for initially receiving light from a source to be analyzed and an off-axis collimator for receiving light from the entrance slit and reflecting a collimated beam of light to the Fabry-Perot filter. A flat plane grating directs the light passed by the Fabry-Perot filter to a spherical grating. The flat plane grating and spherical grating are in a tandem Wadsworth geometry Alternatively, a plurality of Fabry-Perot filters can be used to sequentially filter the collimated beam.

Other features and advantages of the invention will be set forth in, or be readily apparent from, the detailed description of the preferred embodiment and the following drawings.

DETAILED DESCRIPTION OF THE PREFERRED EMBODIMENTS

Figure 1:
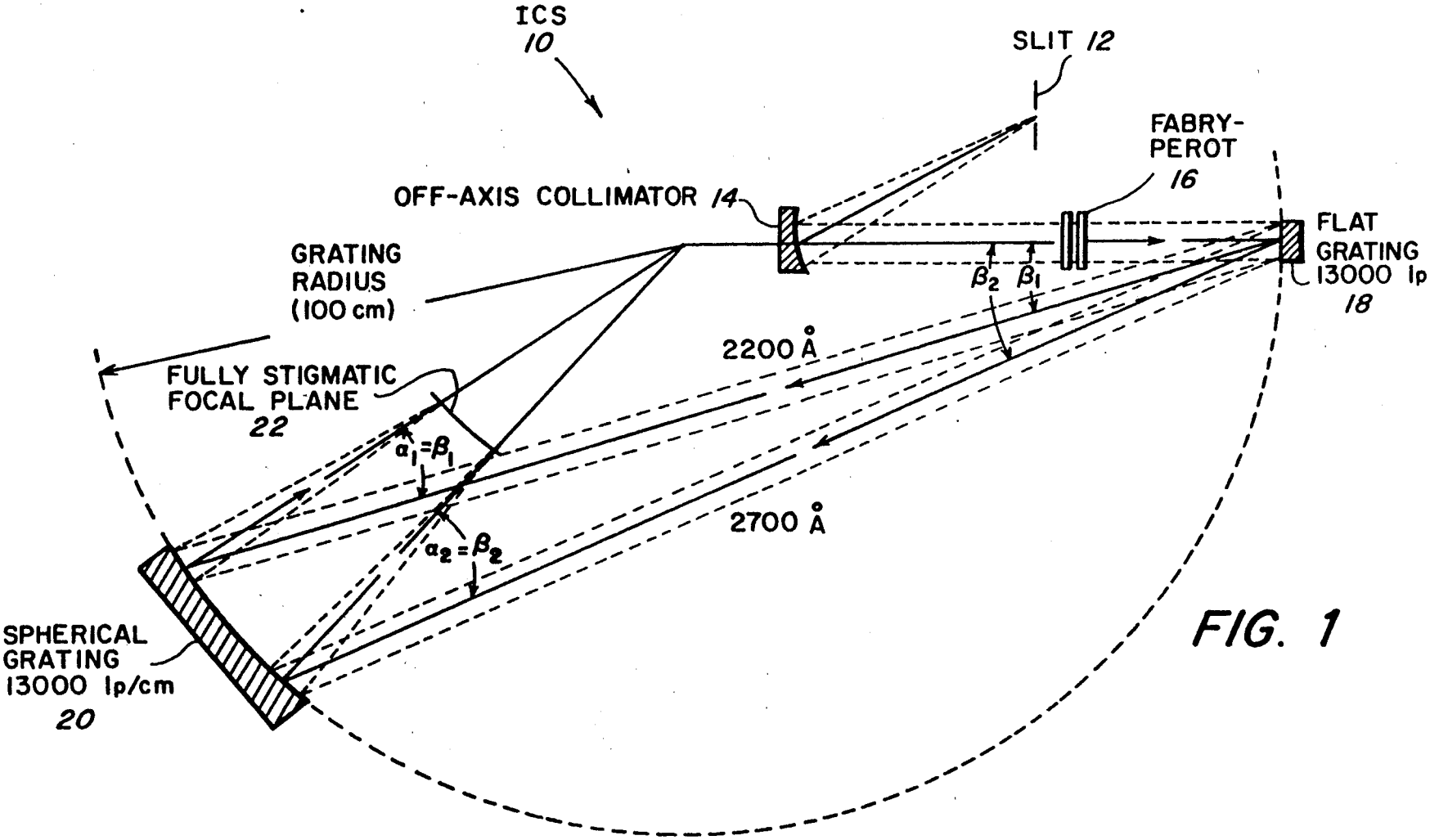
FIG. 1 is a schematic side view of a spectrograph in accordance with the present invention.

Referring now to FIG. 1 which shows a preferred embodiment of an Imaging Channeled Spectrograph according to the present invention. The Imaging Channeled Spectrograph 10 includes an entrance slit 12 having an adjustable width; an off-axis collimator 14; a tunable, bandpass Fabry-Perot filter 16; a spectrographic flat grating 18; and a spectrographic spherical grating 20. These components are arranged such that light to be analyzed passes through entrance slit 12 and is collimated and reflected by off-axis collimator 14. The collimated beam of light is then filtered by Fabry-Perot filter 16 to provide a beam with multiple, narrow, spectral bandwidth "spikes". The filtered collimated beam is then diffracted by flat grating 18 onto spherical grating 20. Spherical grating 20 focuses the spectrum onto the fully stigmatic focal plane 22. Photographic film (not shown) may be positioned at focal plane 22 for recording photographic images of the spectrum. Entrance slit 12, off-axis collimator 14, flat grating 18, and spherical grating 20 together comprise a wide-slit imaging grating spectrograph. Alternatively, off-axis collimator 14 could be replaced by a lens or a cassegraine telescope.

Figure 2:
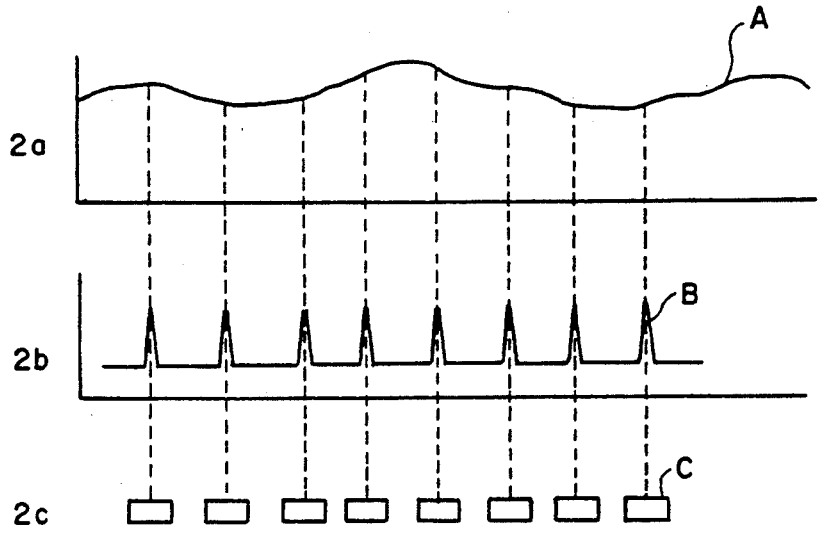
FIGS. 2(*a*) through 2(*c*) show a schematic representation of the spectral decomposition achieved by the embodiment of FIG. 1.

FIG. 2 shows the spectral decomposition achieved by the Imaging Channeled Spectrograph embodiment shown in FIG. 1; wherein 2(*a*) represents the spectral profile A of an observed sample; 2(*b*) represents the plural, frequency spikes B that can be passed by Fabry-Perot filter 16; and 2(*c*) represents the final two-dimensional, mono-chromatic images C produced at focal plane 22. Each image C corresponds to one frequency spike B passed by Fabry-Perot filter 16. As shown in FIG. 2, the narrow band output spikes B of the Fabry-Perot filter have substantially identical frequency widths and are separated by substantially equal frequency spacings.

The central wavelengths and spectral bandwidth of each image C corresponds to spike B of Fabry-Perot filter 16 at that particular central wavelength. The channel central wavelengths, that is the position of spikes B, can be tuned by adjusting the transmission profile of Fabry-Perot filter 16. Each frequency spike B has a finite spectral bandwidth. Ideally, each point within entrance slit 12 would be represented by a single point in image C. However, because of the frequency bandwidth of spike B, the single, ideal point is dispersed (blurred) along focal plane 22. This blur—due to the spectrograph dispersion of the spike bandwidth—results in a lateral chromatic aberration which degrades the spatial resolution of each channel. If the spike bandwidth is selected to be narrow, the blur is minimal.

The channel bandwidth and central wavelength are determined by the bandwidth and peak wavelength of the multiple transmission spikes B of Fabry-Perot filter 16. The location of each channel on focal plane 22, the total field of view, the spatial resolution, and the final magnification are determined by the dispersion and imaging characteristics of the wide-slit imaging grating spectrograph. The following eight principles summarize the relationship between the optional characteristics of Imaging Channeled Spectrograph 10 and the operational parameters of Fabry-Perot filter 16 and the wide-slit imaging grating spectrograph.

1) The spectral bandwidth of each channel is determined solely by the bandwidth of Fabry-Perot filter 16.
2) The spectral separation between channels is equal to the spectral separation of the bandpasses (this separation is termed the free spectral range (FSR)) of Fabry-Perot filter 16.
3) The linear separation between channels is equal to the product of the FSR and the spectrograph dispersion.
4) The linear width and height of the channels at focal plane 22 is equal to the width and height of entrance slit 12, multiplied by the magnification of the wide-slit imaging grating spectrograph.
5) The spectrograph's dispersion of the Fabry-Perot filter's finite bandwidth causes a lateral chromatic aberration at focal plane 22. The magnitude of the aberration is equal to the product of the bandwidth of Fabry-Perot filter 16 and the wide-slit imaging grating spectrograph dispersion.
6) The spatial resolution of imaging channeled spectrograph 10 is identical to the spatial resolution of the wide-slit imaging grating spectrograph with the exception of the chromatic aberration.
7) Rejection of out-of-band wavelengths determines the contrast of Fabry-Perot filter 16. Contrast is measured by the ratio of the transmission of the spikes to the transmission of the rejected frequencies: $T_{max}/T_{min}$
8) The spectral range is limited by the stopband width of the reflective coating on Fabry-Perot filter 16 and the usable range of the grating spectrograph.

The operational parameters of the imaging channeled spectrograph are calculated using the above eight principles combined with the optical characteristics of Fabry-Perot filter 16 and the wide-slit imaging qrating spectrograph. Table I below shows the operational parameters of Fabry-Perot filter 16, calculated for normal incidence and a cavity index of refraction equal to one, when phase terms and angular effects are neglected.

TABLE I

FABRY-PEROT OPERATIONAL CHARACTERISTICS

| Characteristic | Expression |
|---|---|
| Peak wavelength of the mth order | $\lambda_m = 2d/m$ |
| Free spectral range - spectral separation between the m and m−1, m+1 peak wavelengths | $FSR = \lambda_m^2/2d$ |
| Full width at half maximum of the mth wavelength spike | $FWHM_m = FSR_m/F = \lambda_m^2/2dF$ |
| Finesse fixed by the particular Fabry-Perot cavity | F |
| Cavity spacing | d |
| Order of interference | m |
| Inter-order contrast | $C = 1/(1 + 4F^2/\pi^2)$ |
| Spectral range | $\lambda_{iF}$-$\lambda_{fF}$ |

The Fabry-Perot bandpass filter Airy transmission profile consists of consecutive transmission spikes. The condition for constructive interference (with normal incidence and a unity index of refraction) is $2d=m\lambda$ where d is the cavity spacing and m is the interference order (m=1, 2, 3 . . . ). Thus, a particular peak wavelength $\lambda_m$ can be specifically identified by order and cavity spacing ($\lambda_m=2d/m$).

The spectral separation between the $\lambda_m$, $\lambda_{m-1}$, and $\lambda_{m+1}$ peak wavelengths is generally denoted as the free spectral range (FSR). The FSR is determined by the cavity spacing "d" and the particular $\lambda_m$: $FSR_m=\lambda_m^2/2d$; where $\lambda_{iF}$ represents the wavelength at the short wavelength end of the spectral range and $\lambda_{fF}$ represents the wavelength at the long wavelength end of the spectral range.

The shape of the Airy transmission profile from Fabry-Perot filter 16 can be described by its finesse F. F is a fixed property of a Fabry-Perot filter cavity: $F=FSR_m/FWHM_m$; where $FWHM_m$ is the full-width-at-half-maximum of the $m^{th}$ channel. The placement of the Fabry-Perot filter into the wide-slit imaging grating spectrograph must be done with care to avoid significant degradation of the system's spectral properties. Placement of a Fabry-Perot filter into an optical system, and other important factors affecting Fabry-Perot filter performance, are discussed elsewhere (for example, see G. Hernandez, *Fabry-Perot Interferometers.* (Cambridge University Press, New York 1986)).

The basic parameters of a general imaging spectrograph are shown in Table II. Numerous possible configurations are described in other references (for example, M. C. Hutley, *Diffraction Gratinos,* (Academic Press, New York, 1982)). In Table II, lower case "s" denotes the distance along focal plane 22 and upper case "S" (in $\lambda_{iS}$, $\lambda_{fS}$) denotes the short and long wavelength ends, respectfully, of the spectral range of the spectrograph.

TABLE II

IMAGING SPECTROGRAPH OPERATIONAL CHARACTERISTICS

| Characteristic | Expression |
|---|---|
| Linear dispersion | $ds/d\lambda$ |
| Magnification | M |
| Spectral range | $\lambda_{iS}$-$\lambda_{fS}$ |
| Spatial resolution (linear units at the focal plane) | R |
| Entrance slit width | $W_S$ |
| Entrance slit height | $H_S$ |

The characteristics of the imaging channeled spectrograph of FIG. 1 are shown in Table III. The characteristics are a function of the bandpass Fabry-Perot filter and wide-slit imaging grating spectrograph operating parameters and follow the eight basic principles of operation listed above.

TABLE III

IMAGING CHANNELED SPECTROGRAPH OPERATIONAL CHARACTERISTICS

| Characteristic | Expression |
|---|---|
| mth channel central wavelength | $\lambda_m = 2d/m$ |
| mth channel spectral resolution (FWHM) | $FWHM_m = \lambda_m^2/2dF$ |
| Spectral separation between the mth channel and the m − 1, m + 1 channels | $FSR_m = \lambda_m^2/2d$ |
| Linear separation between the mth channel and the m − 1, m + 1 channels at the focal plane | $D_m = FSR_m \times ds/d\lambda$ |
| Linear channel width | $W_c = W_S \times M < D_m$ |
| Linear channel height | $H_c = H_S \times M$ |
| Lateral chromatic aberration in the dispersion direction | $A_m = FWHM_m \times ds/d\lambda$ |
| Spatial resolution along the dispersion direction | limited by $A_m$ and R |
| Spatial resolution perpendicular to the dispersion direction (linear units at the focal plane) | R |
| The shortest detectable wavelength | $\lambda_{ic}$ is the longest of $\lambda_{iF}$ and $\lambda_{iS}$ |
| The longest detectable wavelength | $\lambda_{fc}$ is the shortest of $_{fF}$ and $\lambda_{fS}$ |
| Spectral range | $\lambda_{ic}$-$\lambda_{fc}$ |
| Interference order of $\lambda_{ic}$ | $m_i = 2d/\lambda_{ic}$ |

TABLE III-continued

| IMAGING CHANNELED SPECTROGRAPH OPERATIONAL CHARACTERISTICS | |
|---|---|
| Characteristic | Expression |
| Interference order of $\lambda_{fc}$ | $m_f = 2d/\lambda_{fc}$ |
| Total number of channels | $m_t = m_i - m_f = 2d(1/\lambda_{ic} - 1/\lambda_{fc})$ |
| Out of band rejection | $C = 1/(1+4F^2/\pi^2)$ |

Images C will not overlap if $W_c < D_m$ for all interference orders of interest. If the channels on either side of the channels of interest are blank, image overlap is not a problem and $W_c$ may be increased without penalty. Alternately, if the source has a small angular extent and no significant background radiation is present, a "slitless" spectrograph could be used. The Imaging Channeled Spectrograph of this invention is a versatile and flexible instrument. The channel spectral bandwidth can be varied from broad (for applications such as obtaining emission line images or continuum measurements) to narrow (for applications requiring high spectral resolution measurements of line/continuum profiles). The width of the field of view can be adjusted to match the needs of a particular application. The height is determined by spectrograph/detector limitations: a greater height generally results in poorer image quality and increases the size of the detector required. The performance of the spectrograph elements limits the high spatial resolution that can be achieved. In practice, defects in the Fabry-Perot filter 16 place certain limitations on the performance of the system. An ideal Fabry-Perot filter could have an infinite finesse. However, the actual performance of Fabry-Perot filter 16 is degraded by relative figure errors between the two mirrors comprising the Fabry-Perot filter 16 (the two mirrors are not perfectly flat) and by absorption/scatter in the interferometer. These two defects limit finesse of Fabry-Perot filter 16 to a maximum value, $F_{max}$, which varies widely with wavelength. For reasonable apertures, $F_{max}$ is 100 at visible wavelengths; at UV wavelenqths (about 2288Å), it is about 35. This upper limit on the finesse necessitates certain instrumental compromises between the width of the field of view, the spatial resolution, and the spectral bandwidth.

To illustrate these compromises, the operational parameters will be discussed for three configurations of Imaging Channeled Spectrograph. Each configuration optimizes a different optical characteristic: field of view, imaging properties, and spectral resolution. For all three configurations, the selected characteristic is optimized by varying the operating parameters of Fabry-Perot filter 16 while holding the characteristics of the grating spectrograph system fixed.

The first configuration optimizes the imaging performance of the Imaging Channeled Spectrograph. This is accomplished by maximizing the width of the field of view while maintaining an adequate spatial resolution across it. From Table III, $W_c < D_m = F \times A_m$. Larger $W_c$ can be obtained by increasing F and $A_m$. $A_{m,max}$ is chosen as the maximum tolerable chromatic aberration. F can rise to $F_{max}$. Thus, $$W_{c,max} < D_{m,max} = F_{max} \times A_{m,max}.$$

The fundamental limit on width of the field is the product of $F_{max}$ and the maximum acceptable chromatic aberration.

In the second configuration, the spectral bandwidth is minimized. The bandwidth is inversely proportional to finesse and cavity spacing. Thus, F is increased to $F_{max}$ and the cavity spacing is increased. Larger cavity spacing results in a decreased free spectral range and a corresponding decrease in the linear separation between channels at the focal plane. The linear spacing between channels must be sufficient to distinguish different channels at the Imaging Channeled Spectrograph focal plane or $D_m > R$. In this limiting case $D_m = R$ is chosen. Using Table III, the following expression is derived.

$$FWHM_{m,min} = (1/F_{max}) \times (R \times d\lambda/ds).$$

The last configuration maximizes the width of the field of view for a chosen spectral bandwidth ($FWHM_m$). From Table III, the expression for an upper limit of $W_c$ is derived.

$$W_c < D_m = FWHM_m \times F \times ds/d\lambda.$$

Thus, $W_c$ for a particular $FWHM_m$ is limited by $FWHM_m \times F_{max} x ds/d\lambda$. The chromatic aberration in this configuration is equal to $FWH_m \times ds/d\lambda$.

Figure 3:
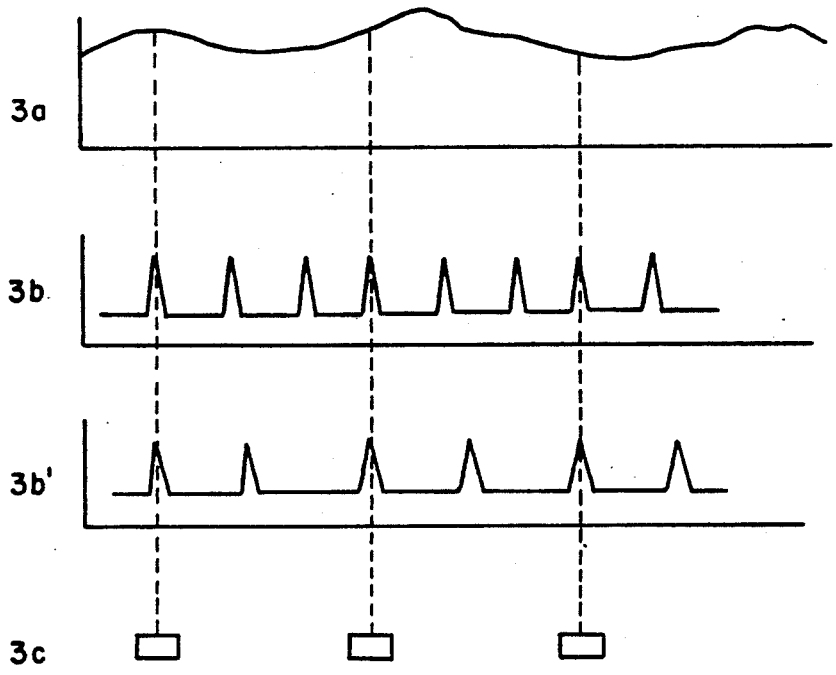
FIG. 3(*a*) through 3(*c*) show a schematic representation of the spectral decomposition achieved by an alternative embodiment of the present invention.

In an alternative embodiment (not shown), Fabry-Perot filter 16 can be replaced by several Fabry-Perot filters in series. FIG. 3 shows the spectral decomposition achieved by an Imaging Channeled Spectrograph having two Fabry-Perot filters in series, wherein 3(*a*) represents the spectral profile of the observed sample; 3(*b*) represents the frequencies that can be passed by the first Fabry-Perot filter; 3(*b'*) represents the frequencies that can be passed by the second Fabry-Perot filter; and 3(*c*) represents the final images produced at the focal plane 22. Final images are produced only for frequencies passed by both Fabry-Perot filters. As shown in FIG. 3, the series of Fabry-Perot filters pass only those frequencies passed by both individual Fabry-Perot filters. While the passed frequencies are transmitted at near 100%, the out of band frequencies are attenuated approximately twice, once in each Fabry-Perot filter. This double attenuation raises the net contrast. Thus combining the Fabry-Perot filters generally increases the spectral spacing between transmission spikes, allows a more flexible spectral resolution and enhances the inter-order contrast (See G. Hernandez, *Fabry-Perot Interferometers*, (Cambridge University Press, New York 1986)). The imaging channeled spectrograph using multiple Fabry-Perot filters typically has a greater field of view (since a wider entrance slit can be used), a higher out of band rejection, a more flexible spectral resolution, a larger frequency separation between images, and a larger spectral range.

In the preferred embodiment, the wide-slit imaging grating spectrograph comprises a fully stigmatic tandem Wadsworth spectrograph (fstW). In a tandem Wadsworth configuration, a flat plate grating is located on an arc passing through the concave spherical surface of a spherical grating. The device in FIG. 1 is an example of the tandem Wadsworth configuration with flat plate grating 18 and spherical grating 20. This configuration is more fully disclosed in articles such as: J.-D. F. Bartoe and G. E. Brueckner, "New Stigmatic, Comafree, Concave Grating Spectrograph", JOSA, 65, 13, (1975). The Fabry-Perot filter comprises a tunable UV Fabry-Perot filter (as disclosed in, e.g., D. G. Socker and C. M. Korendyke, "Imaging and Spectral Performance of Fabry-Perot Interferometers at 2288Å", 168th AAS meeting, (1986).) Those skilled in the art will appreciate that there are numerous techniques for implementing a tunable Fabry-Perot filter. For instance, a reference is made to U.S. Pat. Nos. 4,400,058 (Durand et al); 4,553,816 (Durand et al); and 4,377,324 (Durand et al) and 3,612,655 (Lincoln et al.).

The characteristics of the fstW are given in Table IV. The fstW tandem Wadsworth configuration satisfies the Wadsworth mount condition for stigmatic imaging over its entire wavelength range. The net spot diagram diameter from the remaining aberrations is less than 10 μm. Furthermore, the fstW has a moderate amount of dispersion at the focal plane, provides a nearly perfect location to place the Fabry-Perot filter (in a collimated beam, close to an image of the system entrance aperture) and allows the appropriate amount of magnification to obtain the correct final plate scale.

TABLE IV

FULLY STIGMATIC TANDEM WADSWORTH SPECTROGRAPH CHARACTERISTICS

| Characteristic | Expression/Value |
|---|---|
| Off-axis parabolic collimator | focal length = 16.9 cm |
| Flat grating | 13000 lines/cm |
| Concave grating | 13000 lines/cm<br>$R_c$ = 100 cm |
| Spectral range | 2200–2700 |
| Spatial resolution at the focal plane | <10 μm |
| Entrance slit height | 3.2 mm |
| Entrance slit width | $<D_m/3.2$ |
| Magnification | 3.2 |
| Linear dispersion (dλ/ds) | 75 Å/cm |

The parameters of the UV Fabry-Perot filter for narrow and moderate spectral bandwidths are shown in Table V along with the experimentally demonstrated IV Fabry-Perot filter operational characteristics of interest.

TABLE V

UV FABRY-PEROT OPERATIONAL CHARACTERISTICS

| Characteristic | Value moderate/high spectral resolution |
|---|---|
| Finesse | 37 |
| Cavity spacing | 75/150 μm |
| Inter-order contrast | 0.002 |
| Spectral range | 2250–2650 Å |

Table VI shows the Imaging Channeled Spectrograph operational characteristics as calculated from Table III and the operational parameters of the UV Fabry-Perot filter and fstW.

TABLE VI

IMAGING CHANNELED SPECTROGRAPH OPERATIONAL CHARACTERISTICS

| Characteristic $\lambda_m$ = 2450 Å | Value moderate/high spectral resolution |
|---|---|
| Spectral resolution (FWHM) | 0.11/0.05 Å |
| Spectral separation between channels | 4.0/2.0 Å |
| Linear separation between channels | 0.053/0.027 cm |
| Linear channel width at the entrance slit | 169 μm/81 μm |
| Linear channel height at the entrance slit | 3.2 mm |
| Lateral chromatic aberration at the entrance slit | 4.1 μm/2.1 μm |
| Spatial resolution along the dispersion direction | 4.4 μm/3.2 μm |
| Spatial resolution along the entrance slit | 0.4 sec of arc |
| Spectral range | 2250–2650 Å |
| Total number of channels | 100/200 |
| Out of band rejection | 0.002 |

The Imaging Channeled Spectrograph optical design achieves high spatial and spectral resolution over a large spectral range. A ray race of the preliminary optical design revealed the largest spot sizes at the focal plane to be less than 10 μin diameter. The Imaging Channeled Spectrograph spectral resolution varies directly with the Fabry-Perot filter cavity spacing. Both narrow (0.05 Å) and moderate (0.11 Å) Fabry-Perot filter spectral bandwidths are possible.

By combining Fabry-Perot filter 16 with the wide-slit imaging grating spectrograph, this invention produces a channeled spectrum consisting of a row of monochromatic images of entrance slit. Each channel corresponds to a single monochromatic image which, in turn, corresponds to a single Fabry-Perot filter transmission spike. Since the bandwidth of Fabry-Perot filter 16 determines the channel spectral bandwidth, the width of wide-slit 12 does not degrade the spectral resolution of Imaging Channeled Spectrograph 10. The width of image C is determined by the width of entrance slit 12, and the separation of images at focal plane 22 is determined by the frequency separation between spikes B. Channel-/image overlap is prevented by adjusting the width of entrance slit 12, until the image width is less than the linear spacing between channels. The spectral coverage is limited only by the stopband of the coatings of Fabry-Perot filter 16, and the usable frequency range of gratings 18 and 20. Thus, a single exposure taken at focal plane 22 produces a series of high resolution, non-overlapping, two dimensional monochromatic images covering a broad spectral range.

Although the invention has been described with respect to exemplary embodiments thereof, it will be understood by those skilled in the art that variations and modifications can be effected in these exemplary embodiments without departing from the scope and spirit of the invention.

I claim:

1. An Imaging Channeled Spectrograph comprising:

a Fabry-Perot bandpass filter means for bandpass filtering a received collimated beam of light into a filtered beam; and a wide-slit imaging spectrograph for dispersing said filtered beam; and wherein said Fabry-Perot bandpass filter means and said spectrograph cooperate to produce one image of the entrance slit of said spectrograph for each frequency band passed by said filter means.

2. The invention of claim 1, wherein said Fabry-Perot bandpass filter means comprises at least one UV Fabry-Perot bandpass filter.

3. The invention of claim 1, wherein said wide-slit imaging spectrograph comprises a tandem Wadsworth configuration spectrograph.

4. An Imaging Channeled Spectrograph comprising:

an entrance slit for receiving light from a source to be analyzed;

a collimator means for collimating said light from said entrance slit;

a Fabry-Perot bandpass filter means for filtering said collimated beam;

a grating means for diffracting said filtered beam; and a spherical grating for focusing said diffracted spectrum onto a focal plane; and wherein said collimator means, said filter means, said grating means, and said spherical grating cooperate to produce a plurality of two-dimensional, monochromatic images of said entrance slit.

5. The invention of claim 4, wherein said Fabry-Perot bandpass filter means comprises at least one UV Fabry-Perot bandpass filter.

6. The invention of claim 4, wherein said wide-slit imaging spectrograph comprises a tandem Wadsworth configuration spectrograph.

* * * * *